United States Patent Office 3,180,056
Patented Apr. 27, 1965

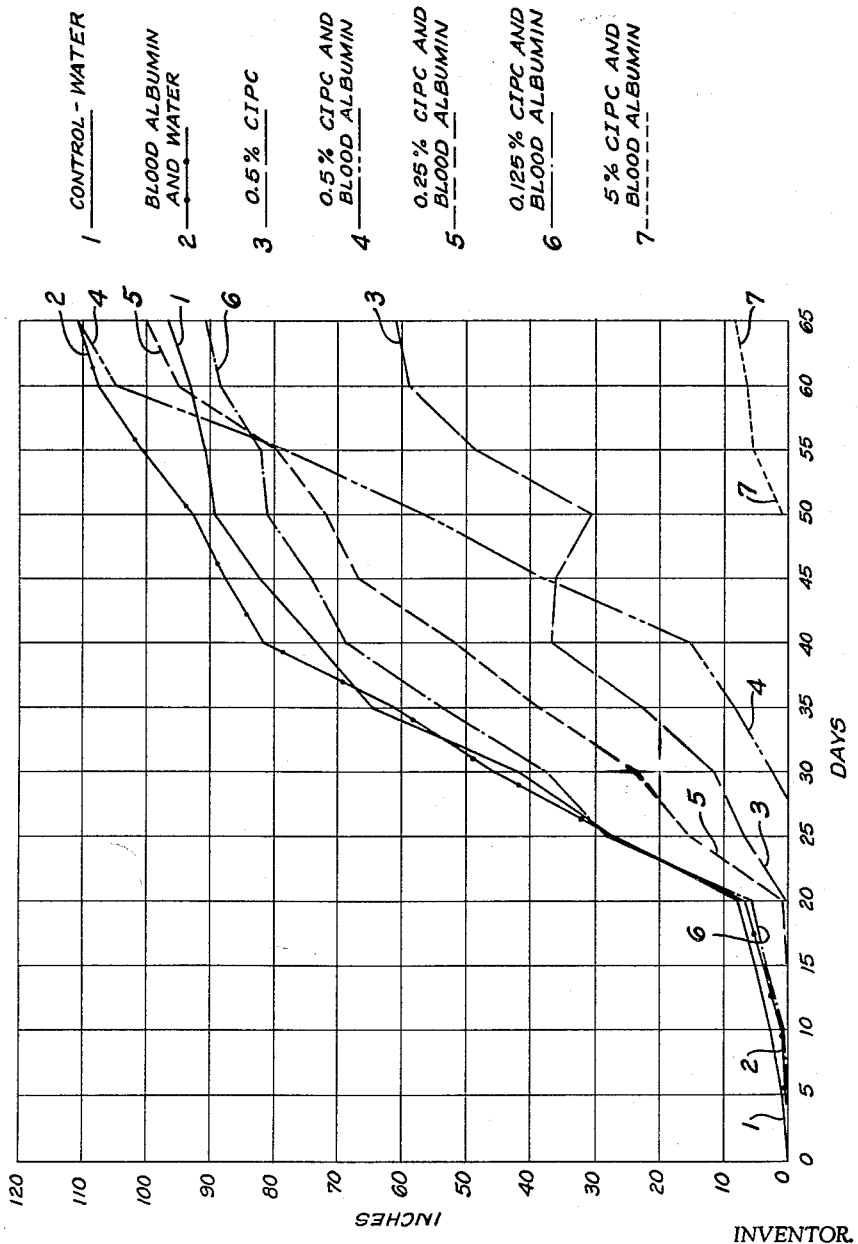

3,180,056
DORMANCY CONTROL OF ROSE PLANTS
Walter E. Lammerts, Livermore, Calif., assignor to Germain's, Inc., Los Angeles, Calif., a corporation of California
Filed Oct. 27, 1961, Ser. No. 148,202
6 Claims. (Cl. 47—58)

This invention relates to the dormancy control of rose plants and, more particularly, provides a process and composition for prolonging the dormancy of the rose plants.

Rose plants are commonly marketed by nurseries in a bare root form, the plants having been dug from the ground by commercial growers and supplied to the nurseries in time for spring sales. The bare root plants must be sold before leafing out occurs or, otherwise, planted in pots or other suitable containers. Potted roses require frequent watering by the nurseryman and are more expensive for a home owner to plant than a bare root plant. Thus, it will be appreciated why a process and composition for prolonging the dormancy of bare root rose plants are highly desirable from the standpoint of the commercial grower, nurseryman and home owner.

In large areas of the United States, particularly in the Rocky Mountain area, the Middle West and the Eastern States, ground-established rose plants are frequently damaged by late frost. Some protection may be had by withholding fertilizer and through limiting watering. However, such practices are generally of little value, serving mainly to minimize the amount of new growth and not, strictly speaking, prolonging dormancy of the plant safely beyond the likely date of a late frost.

It is, therefore, a primary object of this invention to provide a method for prolonging dormancy of rose plants. A still further object is to provide a composition that may be used to this end.

Another object of the invention is to provide an improved method of marketing bare root rose plants, a method which will enable the nurseryman to hold the plants for a longer period of time before occurrence of leafing out.

A further object of the invention is to provide a method that may be employed for prolonging the dormancy of a ground-established rose plant, thus protecting the rose plant against the eventuality of a late damaging frost.

A still further object is to provide a method for prolonging the dormancy of a rose plant without unduly interfering with time of blossoming.

It has now been discovered that the dormancy of a rose plant may be prolonged by treating the rose plant with a composition having a dormancy-prolonging concentration of isopropyl N-3- chlorophenyl carbamate (CIPC) dispersed in a diluent. The abbreviation CIPC will be used interchangeably with isopropyl N-3-chlorophenyl carbaramate. Where the composition is applied to the rose plant by spraying the effectiveness of the CIPC may be enhanced by providing a diluent thickener or spreader, such as blood albumin. There is no advantage, however, in using a thickener where bare root roses are treated by immersion of their canes in a CIPC dispersion. It is believed that the blood albumin retards the evaporation of the composition from a sprayed cane, permitting the CIPC ingredient to reach the buds of the cane in a greater amount than otherwise possible.

Isopropyl N-3-chlorophenyl carbamate has been used heretofore as a herbicidal composition as disclosed in U.S. Patent No. 2,695,225 to Eugene D. Witman. The Witman patent relates to various diluents that may be used for the dispersion of CIPC which diluents are useable in the process of this invention. The disclosure, of the Witman patent is hereby incorporated by reference.

Isopropyl N-3-chlorophenyl carbamate may be placed in a liquid formulation by dissolving it with a suitable hydrocarbon, such as xylene, toluene, kerosene or with alcohols, ethers, ketones and esters containing up to about 10 carbon atoms for example, ethyl alcohol, methyl alcohol, isopropyl alcohol, butyl alcohol, and the like.

Isopropyl N-3-chlorophenyl carbamate is insoluble in water; hence, if the material is to be incorporated in a water base composition, it is necessary that it be dispersed in an emulsion. As an alternative where aqueous solutions rather than emulsions are desired, the carbamate may be placed in water solution by incorporating it first in a water soluble solvent such as alcohol or acetone in an amount sufficient to insure solution of the carbamate material in water. However, it has been experienced that the CIPC is preferably applied in an aqueous emulsion.

The emulsion may be produced in the following fashion. A wetting agent is added to a suitable solvent, such as xylene, and isopropyl N-3-chlorophenyl carbamate to produce an emulsifiable system. Xylene is used in an equal amount with the CIPC. Suitable wetting agents include sodium alkylaryl sulfonates, alkyl naphthalene sulfonic acids, sulfonated dicarboxylic acid esters and the like. The emulsifiable system is then mixed with water to form an aqueous dispersion containing the isopropyl N-3-chlorophenyl carbamate in the desired concentration. The ratio of the wetting agent to the solvent and CIPC will usually be one to three parts by weight of the wetting agent to ten parts of the carbamate and solvent, depending upon the particular wetting agent employed.

The concentration of CIPC desirably used will vary considerably. Normally, the CIPC will be incorporated in the treating composition in an amount less than 1% by weight, and preferably within the range of 0.0025% to 0.8%. The immersion treatment of bare root rose plants will normally employ concentrations in the lower portion of the preferred range, say 0.0025% to 0.01%, depending among other considerations on length of immersion, range of temperatures anticipated, and length of dormancy desired. In immersion treatment it may even be desirable to employ concentrations somewhat less than 0.0025% where lengthy immersions of a half hour or so are used. Ordinarily, an immersion treatment of three to fifteen minutes is adequate for concentrations of 0.0025% to 0.01%. Where the treatment is by spraying, the concentration of CIPC employed is usually in excess of 0.1% and up to 0.8%. Immersion of plants in dispersions as concentrated as those desirably used for spraying may unduly prolong dormancy or even possibly damage the plants. Concentrations in excess of 5% applied by spraying will normally unduly prolong the dormancy of the rose plant for most areas and in some instances possibly damage the buds of the plant. However, concentrations of 5% have been employed successfully but, generally speaking, the dormancy provided is much too long. There is evidence that the dormancy of plants in addition to rose plants may be prolonged in a similar fashion using the same range of concentrations of CIPC.

The application of the isopropyl N-3-chloro phenyl carbamate will generally prolong dormancy of the rose plant from two weeks to two months, depending on the concentration employed, time of year applied, the use or absence of a thickening agent in the composition (where the composition is sprayed), temperatures and other considerations. The use of isopropyl N-3-chlorophenyl carbamat in concentrations less than 1% by weight and preferably within the range of 0.0025% to 0.8% will normally provide the desired prolongation of dormancy without unduly delaying the date of flowering. As an example, in one series of experiments wherein the isopropyl N-3-chorophenyl carbamate was used within the preferred range, dormancy was prolonged for about 25 days and there occurred only a three-day delay in flowering of the treated plants. This characteristic is a most important feature of the process of the invention because a dormancy prolonging spray which would seriously delay time of flowering would not be accepted by rose gardeners who typically desire flowers at the earliest possible date. It has been experienced that when rose plants treated with the preferred concentration of CIPC do finally break dormancy, the growth exhibited is very rapid, exceeding the rate of growth of the untreated rose plants, and will eventually reach a total comparable to, or even possibly greater than, that of the control plants. Thus, it is apparent that during the prolonged period of dormancy, the root system of the treated plant continues to grow and absorb water and nutrients from the soil.

The application of the CIPC composition to rose plants does not adversely affect the flowers. The flowers of treated plants do not differ from those of untreated plants in diameter, petal number, color and other characteristics. In one field test in Reno, Nevada, the process of the invention prolonged dormancy of treated ground-established plants beyond a killing frost which severely damaged the control rose plants. The flowers of the treated rose plants in this field test were fully normal.

Refrigeration is employed today by many commercial growers of bare root rose plants to hold the plants between time of harvest and time of sale. It has been common experience that cold storage rose plants upon removal from refrigeration grow exceedingly rapid. The process of the invention may be used to counterbalance this quick tendency of cold storage rose plants. However, it will normally be more desirable to substitute the CIPC treatment altogether for the refrigeration.

It has been found that the temperature of the atmosphere has a considerable bearing upon the effectiveness of the spray treatment. For example, prolongation of dormancy is almost twice as long at temperatures varying from a minimum of 28° F. at night to about 60° F. in the daytime as compared to temperatures of 45–50° F. at night and up to 114° F. in the daytime. Similarly, the immersion treatment of bare root rose plants is most effective where the treated rose plant is subsequently held in a relatively cool atmosphere. For example, seven minutes immersion of the canes of a bare root rose plant in a dispersion with a concentration of 0.005% CIPC was found to be very effective in prolonging dormancy during relatively cool spring temperatures whereas the same treatment was much less effective during a warmer spell of weather. The age of the solution or emulsion used has some bearing on the length of immersion.

*Example 1*

The results of this test are illustrated graphically in the chart of the sole drawing. Rose plants used in the test were of the variety Topper which had been held dormant in cold storage. The bare root rose plants were removed from storage and sprayed with the various dispersions hereinafter described and planted in two-gallon rose containers the following morning. This test was conducted in Northern California and the plants were held outdoors during the course of the test. The daytime temperatures during the critical first thirty days of the test were below 80° F.

The rose plants of this experiment were divided into seven lots of two rose plants each. Lot 1 was a control which was sprayed with water. Lot 2 was another control which was sprayed with an aqueous blood albumin solution made up of 25 grams of blood albumin to 500 cc. of water but no isopropyl N-3-chlorophenyl carbamate. The remaining five lots were treated with dispersions of isopropyl N-3-chlorophenyl carbamate in various concentrations.

The isopropyl N-3-chlorophenyl carbamate used in these experiments was an emulsion concentrate containing the isopropyl N-3-chlorophenyl carbamate in the amount of 50% by weight, the balance of the concentrate being xylene and a small amount of a sodium alkylaryl sulfonate wetting agent. The aqueous dispersions used for the spraying were prepared by adding the emulsion concentrate (50% isopropyl N-3-chlorophenyl carbamate) in the indicated concentrations to 500 cc. portions of water.

Lot 3 was treated with an aqueous dispersion containing 5 cc. of the emulsion concentrate (50% isopropyl N-3-chlorophenyl carbamate) in 500 cc. of water, giving a CIPC concentration of 0.5%. The latter solution contained no blood albumin. Lot 4 was sprayed with an aqueous dispersion containing 5 cc. of the emulsion concentrate (0.5% CIPC concentration) and 25 grams of blood albumin. Lot 5 was treated with an aqueous dispersion containing 2½ cc. of the emulsion concentrate (0.25% CIPC) and 25 grams of blood albumin in 500 cc. of water. The rose plants of Lot 6 were treated with an aqueous dispersion containing 1¼ cc. of the emulsion concentrate (0.125% CIPC) and 25 grams of blood albumin in 500 cc. of water. Lot 7 was sprayed with an aqueous dispersion comprising 50 cc. of the emulsion concentrate (5% CIPC), 25 grams of blood albumin and 500 cc. of water. On the five day intervals indicated in the chart, the roses of the several lots were examined and the amount of growth determined. The inches of growth indicated in the chart are the total of the two plants of each lot.

The buds of the controlled untreated plants of lot 1 continued to swell, their growth reaching a total of all buds of 2¼ inches in ten days. In comparison, the two plants sprayed with 0.5% concentration of isopropyl N-3-chlorophenyl carbamate and 25 grams of blood albumin in 500 cc. of water (lot 4) showed no growth on the tenth day. As indicated in the chart, the control plants continued to make gradual growth as recorded every fifth day by measuring the young growing buds on all of the canes of the two plants of lot 1. By comparison, there was no evidence of growth on the plants of lot 4 as of the 25th day of the test. When the measurements were made on the 30th day, however, a total of 13 buds on the two plants of lot 4 had begun growing, varying in length from ⅛ to ¼ inch, making the total of 2½ inches indicated on the graph. In a similar fashion each of the buds on all of the other variously treated plants of the other lots was measured every five days and the combined growth of each lot totalled and reported on the graph. It is important to notice that buds on the plants of lot 3 which contain a 0.5% concentration of isopropyl N-3-chlorophenyl carbamate in 500 cc. of water with no blood albumin broke dormancy one week earlier than the plants of lot 4 which were treated with the same concentration of isopropyl N-3-chlorophenyl carbamate but with 25 grams of blood albumin incorporated in the water. There was some evidence of bud swelling of the rose plants of lot 3 the 20th day, although the amount was scarcely measurable.

It will be seen that the rose plants of lots 5 and 6 which were treated with solutions of reduced concentrations of isopropyl N-3-chlorophenyl carbamate broke dormancy significantly earlier than the rose plants of lot 4 which were treated with a solution containing a higher isopropyl N-3-chlorophenyl carbamate concentration. The roses of lot 3 experienced a slight setback in growth between the 40th and 50th days of the test. However, the recovery was very rapid. The performance of the rose plants of lot 3 particularly in comparison with lot 4 demonstrate the advantage to be had in the use of blood albumin with CIPC. Blood albumin permits the use of adequate CIPC to obtain desired length of dormancy without adverse effect on the plant.

The control plants of lots 1 and 2 bloomed on the average only three days earlier than the plants of the other lots treated with isopropyl N-3-chlorophenyl carbamate except for the plants of lot 7 which because of the very high CIPC concentration were considerably behind the other plants. It will be recalled that the plants of lot 7 were treated with an aqueous dispersion containing a 5% concentration of CIPC. The flowers of the treated lots were fully comparable with the flowers of the untreated lots having the same diameter, petal number, color and other characteristics of the particular rose variety. There was no evidence of deterioration of flower quality due to the isopropyl N-3-chlorophenyl carbamate.

It has been found desirable to include certain spreader materials in the dispersions of the isopropyl N-3-chlorophenyl carbamate, especially where the composition is used as a spray in contrast to application employing an immersion dip of bare root plants. The exact role of the spreader is not clearly understood although it is believed that the spreader serves as a vapor depressant material in which role it slows up the evaporation of the isopropyl N-3-chlorophenyl carbamate from the canes of the treated rose plant for a length of time which permits migration of a larger amount of the CIPC into dormant buds of the plant. Of the various known spreaders investigated the most suitable by far has proven to be blood albumin, preferably used in concentrations of 2 to 10% on a weight basis. Another spreader exhibiting same advantage is a spreader known as Moyer spreader made up of heavy petroleum oil and an adhesive material.

*Example II*

In the work of this example various known spreader materials were investigated. Each spreader was incorporated in an amount of 25 cc. in 500 cc. of water along with 5 cc. of an emulsion of isopropyl N-3-chlorophenyl carbamate concentrate (50% isopropyl N-3-chlorophenyl carbamate), giving a 0.5% concentration of the CIPC. The emulsion concentrate was the same as that described in Example I above. The rose plants treated had been held in a bare root state in cold storage. The rose plants of each lot were sprayed with a particular composition, planted in suitable rose containers, and checked every five days for bud growth. The roses of lot 1 were the control and were sprayed with water. Lot 2 was sprayed with a composition containing blood albumin, lot 3 with the Moyer heavy petroleum oil spreader mentioned above, lot 4 with a composition containing a modified phthalic glycerol alkyd resin and lot 5 with a composition containing a spreader having as a principal ingredient alkyl arylpolyoxyethylene glycerol. Roses of lot 6 were treated with a composition having a spreader made up of sodium sulfates of mixed long chain alcohol fatty acid esters and diethylene glycol acetate. The rose plants of lot 7 were treated with a composition having a liquid spreader of polyethylene, fatty acid-amine condensates, and an alkyl aryl sulfonate. The roses of lot 8 were treated with a composition containing a powder type spreader made up of sodium sulfonate and combined fatty acids. Lot 9 was another control lot containing a 0.5% concentration of CIPC with no spreader incorporated. Of the several spreaders (stickers) investigated, only blood albumin and the Moyer spreader were found effective in lengthening the dormancy effect of the isopropyl N-3-chlorophenyl carbamate. The other spreader materials were substantially ineffective and the treated rose plants broke dormancy approximately the same time as the rose plants of the lot treated with CIPC and no spreader. The blood albumin proved to be a more desirable spreader for the purposes of the processes of this invention than the Moyer heavy petroleum base spreader in that the blood albumin treated plants, once they broke dormancy quickly, caught up with the growth of the untreated control.

*Example III*

Six dormant Queen Elizabeth variety roses in five-gallon cans were brought into a hothouse maintained at a minimum temperature of 60° F. with a maximum temperature of 85° F. Two of the rose plants were used as untreated controls. The canes of the third plant were sprayed with an emulsion of 50 parts of isopropyl N-3-chlorophenyl carbamate per thosuand parts of water. Fifty grams of blood albumin were incorporated in the foregoing emulsion. The fourth rose plant was sprayed with an aqueous emulsion containing five parts of isopropyl N-3-chlorophenyl carbamate per thousand parts of water, along with 50 grams of blood albumin. The fifth plant was painted with a thick aqueous slurry of blood albumin (containing 250 grams of blood albumin per thousand cc. of water) having a concentration of 50 parts of isopropyl N-3-chlorophenyl carbamate per thousand parts of water. The sixth rose plant was treated with a thick aqueous slurry (having 250 grams of blood albumin per thousand cc. of water) containing five parts of isopropyl N-3-chlorophenyl carbamate per thousand parts of water. The control plants commenced leafing out in 25 days. The fourth rose plant (5 parts CIPC and 50 grams blood albumin) leafed out about three weeks later than the control plants. The third plant (50 parts CIPC and 50 grams blood albumin) was delayed in bud opening and leafing out about four weeks later than the control plants. It is interesting to note that the sixth plant, which was treated with a very thick aqueous slurry of blood albumin (250 grams) containing a minor concentration of five parts of isopropyl N-3-chlorophenyl carbamate per thousand parts of water, did not begin leafing out until over a month after the control plants. The fifth plant (50 parts CIPC and 250 grams blood albumin) was obviously treated with too much isopropyl N-3-chlorophenyl carbamate as leafing did not occur during the course of the test. Plants 3 and 4 by flowering time were comparable to the control plants and shoot growth and exhibited comparable numbers of flowers. Thus it is seen that in spite of three to four weeks delay in leafing out plants treated in accordance with the process will catch up with control plants and are otherwise normal in growth.

Although exemplary embodiments of the invention have been disclosed herein for purposes of illustration, it will be understood that various changes, modifications, and substitutions may be incorporated in such embodiments without departing from the spirit of the invention as defined by the claims which follow.

1. A method for prolonging dormancy of a rose plant which comprises:
   treating a dormant rose plant with a composition having a dormancy-prolonging concentration of isopropyl N-3-chlorophenyl carbamate and a diluent therefor, said composition being applied to the canes of the dormant rose plant.

2. A method in accordance with claim 1 wherein the composition contains blood albumin in an amount effective to lengthen the dormancy effect of the isopropyl N-3-chlorophenyl carbamate.

3. An improved method of preparing a bare root rose plant for marketing comprising:
   treating the canes of a bare root and dormant rose plant with a composition having a dormancy-retarding concentration of isopropyl N-3-chlorophenyl carbamate and a diluent therefor.

4. A method in accordance with claim 3 wherein the rose plant is immersed in said composition.

5. A method for prolonging dormancy of a ground established rose plant, said method comprising:
   treating dormant canes of the rose plant with a composition having a dormancy-prolonging concentration of isopropyl N-3-chlorophenyl carbamate and a diluent therefor.

6. A method in accordance with claim 5 wherein the composition contains blood albumin in an amount effective to lengthen the dormancy effect of the isopropyl N-3-chlorophenyl carbamate.

(References on following page)

References Cited by the Examiner

UNITED STATES PATENTS

| | | | |
|---|---|---|---|
| 1,931,325 | 10/33 | Pillsbury | 47—58 |
| 2,185,663 | 1/40 | Greenstreet | 47—2 |
| 2,314,928 | 3/43 | Fischer. | |
| 2,322,761 | 6/43 | Lontz | 71—2.6 |
| 2,341,867 | 2/44 | Hitchcock. | |
| 2,364,054 | 12/44 | Avery. | |
| 2,720,726 | 10/55 | Ferguson | 47—58 |
| 2,734,911 | 2/56 | Strain. | |

OTHER REFERENCES

Chemical Abstracts, vol. 44, columns 7940 and 7941, article "A Leaf-repression Method for Evaluation . . ." by Brown, J. W., et al. 1950. QD1.A51.

Chemical Abstracts, vol. 46, columns 5773 and 5774 (1952) article "Relation Between Molecular Structure . . ." by Weintraub et al. QD1.A51.

Chemical Abstracts, vol. 50, column 2110, article "Further Tests With Isopropyl m-Chlorocarbanilate as a Sprout Inhibitor for Potato Tubers" by Heinze, P. H., et al. 1956. QD1.A51.

Day et al.: "Hilgardia," vol. 23, No. 14, 1955, pages 597–612, 71-2.6.

T. GRAHAM CRAVER, *Primary Examiner.*

MAURICE A. BRINDISI, *Examiner.*